US008455405B2

(12) United States Patent
Chakrabarty

(10) Patent No.: US 8,455,405 B2

(45) Date of Patent: Jun. 4, 2013

(54) SOLVENT FOR EXTRACTING BITUMEN FROM OIL SANDS

(75) Inventor: Tapantosh Chakrabarty, Calgary (CA)

(73) Assignee: ExxonMobil Upstream Research Company, Houston, TX (US)

( * ) Notice: Subject to any disclaimer, the term of this patent is extended or adjusted under 35 U.S.C. 154(b) by 637 days.

(21) Appl. No.: 12/606,034

(22) Filed: Oct. 26, 2009

(65) Prior Publication Data

US 2010/0130386 A1 May 27, 2010

(30) Foreign Application Priority Data

Nov. 26, 2008 (CA) ...................................... 2645267

(51) Int. Cl.

*C09K 8/035* (2006.01)
*C23G 5/02* (2006.01)
*C11D 3/20* (2006.01)

(52) U.S. Cl.

USPC ........... 507/268; 507/137; 507/138; 507/260; 507/262; 507/263; 507/265; 507/267; 252/364; 510/366

(58) Field of Classification Search

None

See application file for complete search history.

(56) References Cited

U.S. PATENT DOCUMENTS

| | | | | |
|---|---|---|---|---|
| 4,280,559 | A | 7/1981 | Best | |
| 4,344,485 | A | 8/1982 | Butler | |
| 4,676,889 | A | 6/1987 | Hsieh et al. | |
| 5,236,577 | A | 8/1993 | Tipman et al. | |
| 5,876,592 | A | 3/1999 | Tipman et al. | |
| 5,899,274 | A | 5/1999 | Frauenfeld et al. | |
| 5,968,349 | A | 10/1999 | Duyvesteyn et al. | |
| 6,007,709 | A | 12/1999 | Duyvesteyn et al. | |
| 6,214,213 | B1 | 4/2001 | Tipman et al. | |
| 6,708,759 | B2 | 3/2004 | Leaute et al. | |
| 6,769,486 | B2 | 8/2004 | Lim et al. | |
| 7,141,162 | B2 | 11/2006 | Garner et al. | |
| 7,261,810 | B2 | 8/2007 | Argo et al. | |
| 7,282,136 | B2 | 10/2007 | Howdeshell | |
| 2003/0059452 | A1* | 3/2003 | Giroud | 424/401 |
| 2005/0187748 | A1* | 8/2005 | Chen et al. | 703/11 |
| 2006/0016371 | A1* | 1/2006 | Yadav | 106/400 |
| 2006/0113218 | A1 | 6/2006 | Hart et al. | |
| 2006/0138055 | A1 | 6/2006 | Garner et al. | |
| 2006/0260980 | A1 | 11/2006 | Yeung | |
| 2010/0314117 | A1* | 12/2010 | Li et al. | 166/307 |

FOREIGN PATENT DOCUMENTS

| | | | |
|---|---|---|---|
| CA | 1246993 | A | 12/1988 |
| CA | 2200899 | A1 | 9/1998 |
| CA | 2567399 | A1 | 10/1999 |
| CA | 2633061 | A1 | 8/2001 |

(Continued)

OTHER PUBLICATIONS

Hansen, C. M. et al. (1971) *Encyclopedia of Chemical Technology*, Suppl. vol. 2nd ed., pp. 889-910.

(Continued)

*Primary Examiner* — John J Figueroa

(74) *Attorney, Agent, or Firm* — ExxonMobil Upstream Research Company-Law Department

(57) ABSTRACT

The use of a solvent for bitumen extraction, either from mined oil sands or in situ. The solvent includes (a) a polar component, the polar component being a compound comprising a non-terminal carbonyl group; and (b) a non-polar component, the non-polar component being a substantially aliphatic substantially non-halogenated alkane. The solvent has a Hansen hydrogen bonding parameter of 0.3 to 1.7 and/or a volume ratio of (a):(b) in the range of 10:90 to 50:50.

20 Claims, 2 Drawing Sheets

FOREIGN PATENT DOCUMENTS

| | | | |
|---|---|---|---|
| CA | 2374115 | A1 | 9/2003 |
| CA | 2232929 | C | 5/2004 |
| CA | 2425840 | A1 | 10/2004 |
| CA | 2353109 | C | 12/2005 |
| CA | 2520943 | A1 | 4/2006 |
| CA | 2235085 | C | 1/2007 |
| CA | 2521248 | A1 | 3/2007 |
| CA | 2552482 | A1 | 1/2008 |
| CA | 2299790 | C | 7/2008 |
| CA | 2351148 | C | 7/2008 |
| CA | 2587166 | C | 10/2008 |
| CA | 2613873 | C | 10/2008 |
| CA | 2614669 | C | 12/2008 |
| CA | 2592725 | C | 4/2009 |
| CA | 2595336 | C | 9/2009 |

OTHER PUBLICATIONS

Hansen, C. M. (1999) *Hansen Solubility Parameters—A User's Handbook*: 2nd ed., ISBN 084937248, pp. 1-6, 205-206, 347, 423, 427.

* cited by examiner

SOLVENT FOR EXTRACTING BITUMEN FROM OIL SANDS

CROSS-REFERENCE TO RELATED APPLICATION

This application claims priority from Canadian Patent Application 2,645,267 filed Nov. 26, 2008 entitled SOLVENT FOR EXTRACTING BITUMEN FROM OIL SANDS, the entirety of which is incorporated by reference herein.

FIELD OF THE INVENTION

The present invention relates generally to solvents for use in bitumen extraction.

BACKGROUND OF THE INVENTION

Bitumen and heavy oil (collectively referred to herein as "bitumen") reserves exist at varying depths beneath the surface. More shallow reserves are often mined followed by surface extraction. Deeper reserves are often exploited by in situ processes.

Solvents have been used for both in situ and surface extraction processes.

For in situ recovery processes, solvents have been injected alone and in combination with steam. Solvents reduce bitumen viscosity by dilution, while steam reduces bitumen viscosity by raising the bitumen temperature.

It is desirable to provide an improved, or alternative, solvent for bitumen extraction.

SUMMARY OF THE INVENTION

It is an object of the present invention to obviate or mitigate at least one disadvantage of previous compositions or processes.

Generally, embodiments of the present invention provide a solvent for use in extracting bitumen from mined and non-mined oil sands, or for use in cleaning bitumen-coated equipment and vessels used in the extraction processes.

The present solvent is a blend of a polar solvent and a non-polar solvent, neither of which individually is a good solvent for bitumen. The present solvent is referred to herein as a "polar non-polar blend" or PNP. The solvent power may approach that of two known aromatic solvents for bitumen, namely xylene and toluene. The present solvent may be faster (for instance 2 to 3 times faster) in penetrating the oil sands matrix, producing more (for instance 2 to 3 times more) oil per unit time than toluene. With a significantly lower boiling point (BP) range (BP: 36 to 57° C. @ 101.3 kPaa) than that for toluene and xylene (BP: 110-144° C. @ 101.3 KPaa), the present solvent may be easier to recover from the extracted bitumen. The present solvent may be faster (for instance 2 to 3 times faster) in penetrating the oil sands matrix, producing more (for instance 2 to 3 times more) oil per unit time than alkanes like pentane and heptane.

For surface extraction of bitumen from mined oil sands, the present solvent provides a non-aqueous route to extracting the bitumen to eliminate, or reduce, the need for the tailings ponds. The use of the present solvent in this application may extract more bitumen in less time than at least certain conventional solvents.

For in situ extraction of bitumen from oil sands too deep to be amenable to surface mining, the present solvent is, in one embodiment, injected alone (or with steam) into oil sands. In another embodiment, the present solvent or its polar component is mixed with gas plant condensates (a conventional solvent commonly used in bitumen extraction because of its availability) to improve the effectiveness of the latter in recovering oil. In another embodiment, the present solvent is used to extract the oil between a horizontal injector and a horizontal producer to establish communication between the two wells, prior to steam injection to start the Solvent-Assisted gravity Drainage (SAGD) process. An example of SAGD is described in U.S. Pat. No. 4,344,485 (Butler).

For cleaning bitumen-coated vessels and equipment used in extracting bitumen, the present solvent provides environmentally safer alternative to aromatic (e.g. toluene or xylene) solvents.

Potential advantages of the present solvent over conventional solvents in extracting bitumen may include faster extraction, more efficient solvent separation from solvent-diluted bitumen, and less environmental and safety concerns.

In a first aspect, the present invention provides a use of a solvent for extracting bitumen, the solvent comprising: (a) a polar component, the polar component being a compound comprising a non-terminal carbonyl group; and (b) a non-polar component, the non-polar component being a substantially aliphatic substantially non-halogenated alkane; wherein the solvent has a Hansen hydrogen bonding parameter of 0.3 to 1.7. In one embodiment, the Hansen hydrogen bonding parameter is 0.7 to 1.4. In one embodiment, the solvent has a volume ratio (a):(b) of 10:90 to 50:50. In one embodiment, the volume ratio is 10:90 to 24:76. In one embodiment, the volume ratio is 20:80 to 40:60. In one embodiment, the volume ratio is 25:75 to 35:65. In one embodiment, the volume ratio is 29:71 to 31:69. In one embodiment, the polar component (a) is a ketone. In one embodiment, the polar component (a) is acetone. In one embodiment, the non-polar component (b) is a C2-C7 alkane. In one embodiment, the non-polar component (b) is a C2-C7 n-alkane. In one embodiment, the non-polar component (b) is an n-pentane. In one embodiment, the non-polar component (b) is an n-heptane. In one embodiment, the non-polar component (b) is a gas plant condensate comprising alkanes, naphthenes, and aromatics. In one embodiment, the bitumen extraction is in situ bitumen extraction. In one embodiment, the use is for injecting the solvent into an injection well to reduce the viscosity of in situ bitumen. In one embodiment, the use is for in situ bitumen extraction by solvent-assisted steam-assisted gravity drainage, a cyclic solvent process, a liquid addition to steam for enhanced recovery process, a vapour extraction process, or a heated solvent process. In one embodiment, the bitumen extraction is surface extraction. In one embodiment, the bitumen extraction is non-aqueous surface extraction.

In further aspect, the present invention provides a use of a solvent for cleaning a bitumen-coated surface, the solvent comprising: (a) a polar component, the polar component being a compound comprising a non-terminal carbonyl group; and (b) a non-polar component, the non-polar component being a substantially aliphatic substantially non-halogenated alkane; wherein the solvent has a Hansen hydrogen bonding parameter of 0.3 to 1.7. In one embodiment, the Hansen hydrogen bonding parameter is 0.7 to 1.4. In one embodiment, the solvent has a volume ratio (a):(b) of 10:90 to 50:50. In one embodiment, the volume ratio is 10:90 to 24:76. In one embodiment, the volume ratio is 20:80 to 40:60. In one embodiment, the volume ratio is 25:75 to 35:65. In one embodiment, the volume ratio is 29:71 to 31:69. In one embodiment, the polar component (a) is a ketone. In one embodiment, the polar component (a) is acetone. In one embodiment, the non-polar component (b) is a C2-C7 alkane. In one embodiment, the non-polar component (b) is a C2-C7 n-alkane. In one embodiment, the non-polar component (b) is an n-pentane. In one embodiment, the non-polar component (b) is an n-heptane. In one embodiment, the non-polar component (b) is a gas plant condensate comprising alkanes, naphthenes, and aromatics.

A "substantially aliphatic substantially non-halogenated alkane" means an alkane with less than 10% by weight of aromaticity and with no more than 1 mole percent halogen atoms. In other embodiments, the level of aromaticity is less than 5, less than 3, less than 1, or 0% by weight.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
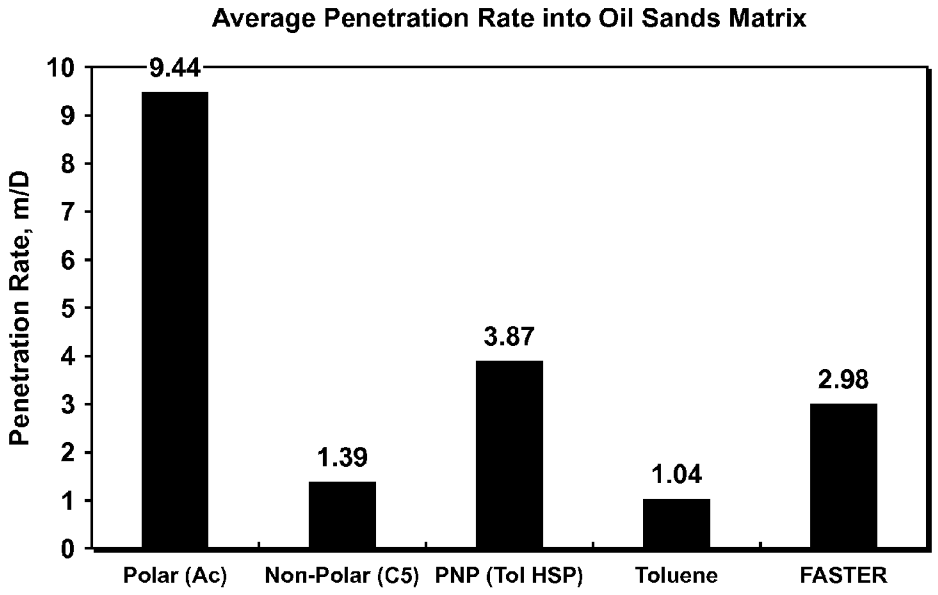
FIG. 1 is a graph comparing solvent penetration rates into an oil sands matrix by different solvents.

Solvents that have previously been suggested for bitumen recovery include n-alkanes, such as ethane, propane, butane, pentane, and gas plant condensates (a mixture of n-alkanes, naphthenes and aromatics). These solvents are not very good solvents for bitumen because they precipitate asphaltenes when their concentrations exceed certain limits. The precipitated asphaltenes may adversely affect the permeability of the reservoir. Aromatic solvents, such as toluene and xylene, are excellent solvents for bitumen by being miscible with bitumen in all proportions and dissolving all four components of bitumen: saturates, aromatics, resins and asphaltenes (SARA). The aromatic solvents, however, are not considered for bitumen recovery because of their cost, material safety issues and relatively higher boiling points (for example 110 to 144° C.), the latter leading to poor solvent recovery from the reservoir. A solvent possessing the solvency power of aromatic solvent but having a lower boiling point is desirable.

In steam-based recovery processes, such as SAGD (Steam Assisted Gravity Drainage) and SA-SAGD (Solvent Assisted-Steam Assisted Gravity Drainage). An example of SA-SAGD is described in Canadian Patent No. 1,246,993 (Vogel) establishing thermal communication between two horizontal wells (injector and producer) is important. This is conventionally done by steam circulation in each well. This method is not very efficient as it can take more than, for instance, 90 days to establish the communication, delaying the oil production and revenue generation. It is desirable to expedite the communication between the well pairs in SAGD and SA-SAGD.

In surface extraction of bitumen, hot-water extraction is a known commercial process. This process produces a large quantity of tailings, the disposal of which is an environmental issue. Solvent has been proposed to extract the bitumen; however, the recovery of bitumen and the recovery of the solvent from the extracted bitumen are two factors that make the non-aqueous extraction of bitumen unattractive. It is desirable to have a solvent that increases bitumen extraction efficiency and requires less energy to be separated from the solvent-diluted bitumen.

Finding a cost-effective, safer-to-use solvent is desirable for the solvent-based in situ and surface extractions of bitumen from oil sands. One scientific tool, very commonly used in the paint industry, for preparing a solvent blend is the matching of the Hildebrandt solubility parameter (HSP) by a volume-fraction-averaged mixing rule. In this tool, two inadequate solvents, which may be cheaper and/or environmentally safer to use, are mixed in a proportion to match the HSP of the best known solvent for that application. The present inventor applied this tool to find a toluene-equivalent solvent for Alberta bitumen (or bitumen generally), and it was determined that the mixture of two solvents matching the Hildebrandt solubility parameter of toluene was not a good solvent for bitumen.

As described below, embodiments of the present invention were made by deviating significantly from the recipe suggested by the conventional Hildebrandt solubility parameter tool for mixing solvent.

In one embodiment, the present solvent is a blend of a polar and a non-polar solvent mixed in a proportion such that it possesses the desirable properties of penetrating the oil sands matrix faster than the non-polar component (proposed in prior art as a bitumen solvent) and increasing bitumen recovery per unit time over that by each component solvent alone.

The non-polar component of the PNP blend may be an alkane, for example ethane, propane, butane, pentane, hexane, heptane, or other higher molecular weight alkanes. In one embodiment, the alkane has up to 10 carbon atoms per molecule. In one embodiment, the alkane has up to 20 carbon atoms per molecule. In one embodiment, the non-polar component of the PNP blend has a low-boiling point of less than 125° C. that can be easily separated from in situ or surface-extracted solvent-diluted bitumen. Alkanes have been suggested in the prior art as bitumen solvents. Compared to toluene and xylene, which dissolve all the four components of bitumen, namely saturates, aromatics, resins and asphaltenes (SARA), and are miscible with bitumen in all proportions, alkanes do not dissolve asphaltenes and are not miscible with bitumen at high solvent concentrations. As exemplified in Example 1, alkanes are very slow acting in that they penetrate an oil sands matrix at a very slow pace, recovering an uneconomic amount of oil per unit time. The speed of solvent penetration into a mined oil sands matrix is one important property that has not been considered in selecting solvent by those skilled in the art.

The polar component of the present solvent may be an organic compound comprising a non-terminal carbonyl, C═O group, such as acetone ($CH_3$—CO—$CH_3$), with the general formula: R1(CO) R2, where R1 and R2 may be the same or different and may be branched, and where the carbon number of R1 and R2 may be 1 to 5. These compounds have not been proposed as bitumen recovery solvents in the prior art as they alone are very poor solvents for bitumen (see Example 6). What is not appreciated in the prior art is their faster speed of penetration into an oil sands matrix for surface extraction. It is unexpectedly found during the experiments leading up to the present solvents that the polar compounds are much faster than the alkanes in penetrating an oil sands matrix or bitumen free of sands. By blending a "speedster" polar component with a "not-so-fast" non-polar component, both the speed of penetration of the solvent blend into an oil sands matrix (see FIG. 1) and the bitumen recovery per unit weight of oil sands and per unit time (see FIG. 3) are surprisingly increased relative to alkanes, toluene or xylene.

Toluene and xylene are excellent solvents for bitumen and are routinely used in labs for cleaning bitumen-coated lab wares. Their use in bitumen recovery is impractical because of material safety issues and their high boiling points (see Table 1) that lead to significant solvent loss in the reservoir. As shown in Example 1 and FIG. 4, toluene's penetration rate into an oil sands matrix is even lower than that for pentane.

The present solvent was invented while attempting to find a toluene-equivalent solvent by blending two solvents to match toluene's Hildebrandt solubility parameter (HSP) of 8.9. To match this HSP by blending acetone (HSP=9.6) and pentane (HSP=7.1) would require 70 vol % acetone (Ac) and 30 vol % n-pentane (n-C5) based on the volume-fraction-averaged mixing rule. This blend, however, was found not to be a very good solvent for bitumen (see Example 1 and FIG. 3).

While experimenting with different solvents and solvent blends for their ability to dissolve Cold Lake bitumen, it was noted that the acetone-rich solvent matching the HSP of toluene was penetrating the bitumen drops—placed on a stainless steel lab countertop inside a fumehood—faster than toluene, but without dissolving much bitumen. To take advantage of the speed, but to increase the dissolution power, it was decided to reverse the ratio of acetone to pentane from 70:30 (v/v) to 30:70 (v/v). The reverse ratio blend dissolved the bitumen drops faster than toluene or alkanes.

The reverse ratio PNP blend (30:70) has an HSP of 7.9, which is significantly different from the HSP of 8.9 for toluene. Thus, one skilled in the art, using the HSP tool, would not try the present solvent.

In addition to the counter-top bitumen dissolution experiments, several proof-of-concept experiments were conducted to validate the invention. These included comparing the dissolving power of the present 30:70 PNP solvent, n-C5, n-C7 and toluene by immersing bitumen-coated flat stainless steel blades in each solvent pool without stirring, and videotaping the progression of the dissolution. Once again, the present 30:70 solvent dissolved the bitumen from the blades sooner than the pure alkane solvents and toluene. Subsequent bitumen extraction experiments were conducted by placing Cold Lake bitumen-coated glass beads in stainless steel mesh tea bags and immersing them in different solvents of interest and videotaping the plumes of diluted bitumen spreading into the solvent pool. The present 30:70 PNP solvent extracted more bitumen than the alkanes, leaving the extracted glass beads essentially bitumen-free.

These proof-of-concept experiments were later complemented with more controlled experiments in which Athabasca oil sands were packed into graduated glass cylinders with a screen at the bottom to retain the sands and to allow the solvent-diluted bitumen product to drain by gravity.

A blend consisting of 30 vol % acetone and 70 vol % n-heptane with an HSP of 8.1 was also found to be a very good solvent for bitumen.

In one embodiment of the present invention, the polar non-polar (PNP) blend has a Hansen hydrogen bonding parameter of 1.02, which is very close to that for toluene (0.9). In another embodiment of the present invention, the PNP blend has a Hansen hydrogen bonding parameter of about 1.2. In another embodiment of the present invention, the PNP blend has a Hansen hydrogen bonding parameter of about 0.8. It appears that Hansen hydrogen bonding parameter rather than HSP is a better mixing rule parameter for finding a toluene-equivalent solvent for bitumen. In certain embodiments, the solvent composition has a Hansen hydrogen bonding parameter of 0.3 to 1.7, or 0.7 to 1.4.

The Hansen Solubility Parameter System is now described further. In principle, each solvent has a unique set of solvency characteristics described by their Hansen parameters: D=dispersive or "non-polar" parameter; P=polar parameter; and H=hydrogen bonding parameter. Each of the parameters describes the bonding characteristic of a solvent in terms of polar, non-polar, and hydrogen bonding tendencies. According to the Hansen Solubility Parameter System, a mathematical mixing rule can be applied in order to derive or calculate the respective Hansen parameters for a blend of solvents from knowledge of the respective parameters of each component of the blend and the volume fraction of the component in the blend. Thus according to this mixing rule:

$$P_{blend}=\Sigma V_i P_i,\ D_{blend}=\Sigma V_i D_i \text{ and } H_{blend}=\Sigma V_i H_i,$$

where Pblend is the Hansen polar parameter of the blend, Vi is the volume fraction for component i in the blend, Pi is Hansen polar parameter for component i in the blend, Dblend is the Hansen dispersive parameter of the blend, Di is the Hansen dispersive parameter for component i in the blend, Hblend is the Hansen hydrogen bonding parameter of the blend, Hi is the Hansen hydrogen bonding parameter for component i in the blend, and where summation is over all i components in the blend. For further details and explanation of the Hansen Solubility Parameter System see for example Hansen, C. M. and Beerbower, Kirk-Othmer, Encyclopedia of Chemical Technology, (Suppl. Vol. 2nd Ed), 1971, pp 889-910 and "Hansen Solubility Parameters A User's Handbook" by Charles Hansen, CRC Press, 1999.

Consisting of components which are environmentally safer than toluene or xylene, the present solvent has two other potential advantages for the bitumen recovery application.

First, the viscosity of the present 30:70 PNP solvent, as exemplified by a blend consisting of 30 vol % Acetone and 70 vol % n-C5, is 0.26 cp @ 20° C., which is significantly lower than 0.59 cp, the viscosity of toluene @ 20° C., as shown in Table 1. Thus, the present solvent should reduce the viscosity of bitumen more than toluene.

Second, the boiling point (BP) of the present solvent, as exemplified by a blend consisting of 30 vol % Acetone and 70 vol % n-C5, is lower by at least 53.5° C. than that of toluene (see Table 1). A lower BP means it will be easier to retrieve the PNP solvent from the reservoir following its injection and will require significantly less energy to distill the PNP solvent from the produced solvent-diluted bitumen.

TABLE 1

Properties of an example of the present solvent, its constituents and toluene:

| Properties | Acetone (Ac) | Pentane (C5) | Example of Present Solvent (30 vol % Ac, 70 vol % C5) | Toluene |
|---|---|---|---|---|
| HSP | 9.6 | 7.1 | 7.9 | 8.9 |
| ρ @20° C., kg/m$^3$ | 790 | 626 | 741 | 867 |
| μ @20° C., cp | 0.32 | 0.24 | 0.26 | 0.59 |
| BP @101.3 kPa, ° C. | 56.3 | 36 | 36 to 56.5 | 110 |

In practicing an embodiment of the invention for in situ extraction of bitumen, the solvent may be injected into a bitumen-bearing reservoir through an injection well (vertical, horizontal, or otherwise). On contact with the solvent, the bitumen becomes dissolved in the solvent and its viscosity is reduced.

In one embodiment, the same well is used for injection of solvent and production of the solvent-diluted bitumen in a cyclical manner. An example of a cyclic solvent process is described in U.S. Pat. No. 6,769,486 (Lim et al.) entitled "Cyclic Solvent Process for In-Situ Bitumen and Heavy Oil Production".

In another embodiment, the production is continuous from a neighbouring horizontal or vertical well which is at some distance from the injection well.

In yet another embodiment, the solvent is injected from a horizontal well and the diluted bitumen is produced from a horizontal well spaced at a certain depth below the injector. Injection and production from this well pair is either continuous or cyclical.

In yet another embodiment of the invention, the solvent mixture is used to enhance the performance of steam-based recovery processes, such as Steam-Assisted Gravity Drainage (SAGD) or Cyclic Steam Stimulation (CSS). In both applications, the present solvent may penetrate the oil sands matrix at a faster rate. An example of a SAGD process is described in U.S. Pat. No. 4,344,485 (Butler). An example of a CSS process is described in U.S. Pat. No. 4,280,559 (Best).

In yet another SAGD application, the present solvent of this invention may be used to develop fluid communication between the injector and producer by recovering the bitumen from the oil sands matrix contained therein. The higher penetration rate of the present solvent and its higher oil production rate are shown in Examples 1 and 2.

In yet another embodiment, the effectiveness of the gas plant condensates in CSS or SAGD can be improved by blending them with the present solvent or the polar component of the present solvent (see Example 4).

Other in situ processes that may be used include: VAPEX and LASER. An example of VAPEX is described in U.S. Pat. No. 5,899,274 (Frauenfeld). An example of LASER is described in U.S. Pat. No. 6,708,759 (Leaute et al.). Another in situ process that may be used is a heated solvent process, such as described in Canadian patents/applications numbers 2,299,790; 2,633,061; 2,351,148; 2,235,085; 2,567,399; 2,374,115; and 2,552,482.

A combination of the above in situ processes may also be used.

In practicing an embodiment of the invention for the surface extraction of bitumen, the present solvent may be used for non-aqueous extraction of oil sands. After extraction, the solvent may be recovered from the extracted sands and recycled. Solvent may also be recovered from the solvent-diluted extracted bitumen for recycling. As shown in the examples below, the present solvent extracts more oil per unit weight of oil sands and per unit time than toluene or pentane.

A characteristic of at least one embodiment of the present solvent is its ability to go through a water layer separating the oil sands matrix from the solvent (see Example 3).

In practicing an embodiment of the invention for cleaning bitumen-coated equipment and vessels used in extracting bitumen, the present solvent may replace aromatic solvents such as toluene or xylene (see Example 5).

EXAMPLES

In bitumen extraction by solvent, the speed of extraction and the amount of total oil recovered are both important economic factors. Keeping this in mind, embodiments of the invention are illustrated by the following examples that compare the present solvent with other solvents of interest: alkane, acetone, acetone-pentane blend matching the HSP of toluene, and toluene. The solvents are compared with respect to the following four dependent variables:

(a) the penetration rate of solvent into Athabasca oil sands matrix;

(b) the time to produce the bitumen with a given volume of solvent from an oil sands pack of specific depth;

(c) the amount of oil recovered per unit weight of oil sands; and (d) the amount of oil recovered per unit weight of oil sands per unit time.

Example 1

Comparison of Penetration Rates of the Present 30:70 PNP Solvent and Conventional Solvents Mined Athabasca oil sands procured from the Syncrude site at Fort McMurray were homogenized by kneading and 21.23 g of the homogenized oil sands were packed into a 50-mL graduated glass (Pyrex™) cylinder to a depth of 4 cm using a round-bottomed solid metallic rod (8 mm diameter). A fine-mesh screen was attached to the open bottom of the graduated cylinder to allow drainage of the solvent-diluted bitumen while retaining the sands.

Oil sands were packed into five graduated cylinders. In each of the five cylinders, 22 mL of one of five solvents (pentane, acetone, solvent blend matching the HSP of toluene, toluene and present solvent (30 vol. % acetone and 30 vol. % n-pentane) was poured on top of the oil sands. The penetration of each solvent was recorded by measuring the penetrated solvent depth visible from the transparent glass wall of the graduated cylinder as a function of time. The time was recorded from the instant the solvent contacted the oil sands to the time the first drop of oil was produced. The experiment was conducted at room temperature (21° C.) and atmospheric pressure with the cylinder top capped with an aluminum foil to prevent solvent loss by evaporation. An average penetration rate was calculated by dividing the height of the bed by the time it took for the first drop of diluted oil to be produced.

The experiments were conducted using acetone, toluene, a solvent blend matching the HSP of toluene and the present 30:70 solvent (30 vol % Acetone, 70 vol % C5).

For matching the HSP of toluene, a solvent mixture was prepared by mixing 70 parts by volume of the polar solvent, acetone, with 30 parts by volume of the non-polar solvent, n-pentane. The HSP of this blend matches the HSP of toluene (8.9), an excellent solvent for bitumen.

FIG. 1 compares the penetration rate of the present solvent with four solvents: acetone, solvent blend matching the HSP of toluene, toluene, and pentane. The average penetration rate of n-pentane in the Athabasca oil sands under the test conditions was 0.97 mm/s or 1.39 m/day and that of toluene was 1.04 m/day. By comparison, the average penetration rate of the present invention was 2.98 m/day, which is 2.85 times faster than toluene and 2.14 times faster than n-pentane.

Acetone is the fastest at 9.44 m/day but, as will be shown later, it also extracts the least amount of oil. The 70:30 PNP solvent blend (70 vol % acetone, 30 vol % C5) matching the HSP of toluene is the second fastest, because of higher proportion of acetone, but as will be shown later it is less efficient than the 30:70 solvent blend in recovering oil.

Example 2

Comparison of Bitumen Extraction Efficiency of the Present 30:70 PNP Solvent with Conventional Solvents For a solvent to be economic in in situ bitumen recovery, its speed of penetration as well as the total bitumen recovery are both important factors. In other words, the desired solvent should recover more bitumen faster. Example 2 compares the bitumen recovery efficiencies of the five solvents mentioned above.

To compare the bitumen extraction efficiencies of the five solvents, the tests in Example 1 were continued by collecting all the solvent-diluted bitumen draining out from the oil sands pack in a pre-weighed aluminum dish placed inside a fume hood. The time to complete the drainage, starting from the time the solvent contacted the oil sands to the time of the last drop of oil, was recorded. The solvent from the bitumen was evaporated in an oven at 80° C. to a constant weight and the total amount of solvent-free bitumen was reported as grams (g) bitumen recovered per kilograms (kg) of oil sands.

For n-pentane, the solvent-diluted produced bitumen initially was very thick and dark-coloured (i.e. bitumen-rich) and with time became progressively solvent-rich. The time to complete the solvent-diluted bitumen drainage with pentane was 70.75 min (plotted as bitumen production time in the y-axis of FIG. 2). The total solvent-free bitumen recovered by n-pentane from the Athabasca oil sands was 58.20 g per kg of oil sands (FIG. 3).

For the polar solvent (acetone), the produced diluted bitumen right from the start was solvent-rich and very light coloured. The time to complete the solvent drainage in this experiment was 23.4 minutes.

The oil extracted by acetone was strikingly different from the oil produced by pentane and other solvents in that its colour was distinctly orange, compared to the dark colour of the oil extracted by others. It is apparent that acetone can extract only the polar components of the bitumen.

The total solvent-free bitumen recovered by acetone from the Athabasca oil sands was only 16.93 g per kg of oil sands (FIG. 3), which was 3.7 times lower than the amount recovered by pentane. The lower oil production by the polar solvent was not unexpected as it was known to be a poor solvent for bitumen.

For the toluene, the bitumen production time was 152 minutes which was 3.5 times higher than the amount recovered for the present solvent, discussed below. Toluene, however, produced 114.48 g bitumen per kg oil sands, the highest of all the five solvents tested.

For the PNP mixture matching the HSP of toluene, the produced oil was a mixture of solvent-rich and bitumen-rich oil, creating an interesting pattern of colour in the dish. The bitumen-rich fluid formed a nice ring of beads around the light brown-coloured solvent-rich oil. The total solvent-free bitumen recovered from the Athabasca oil sands by the PNP solvent matching the HSP of toluene was 33.84 g/kg oil sands, which was 1.8 times lower than the amount recovered by pentane. The lower oil production by this PNP mixture is surprising in view of its matching the HSP of toluene, which produces the most overall bitumen, albeit at a slower pace.

For the PNP solvent of the present invention, the produced oil was initially very thick and progressively became thinner with time. The time to complete the solvent drainage in this experiment was 43.3 min. This was 1.6 times lower than the time needed to complete the production with the non-polar solvent, n-pentane. The total solvent-free bitumen recovered from the Athabasca oil sands by the present solvent was 98.96 g/kg oil sands, which was 1.8 times higher than that by the non-polar solvent, n-pentane. This example clearly highlights the advantage of the present solvent which recovers 1.8 times more bitumen in 1.6 times less time than pentane.

Figure 2:
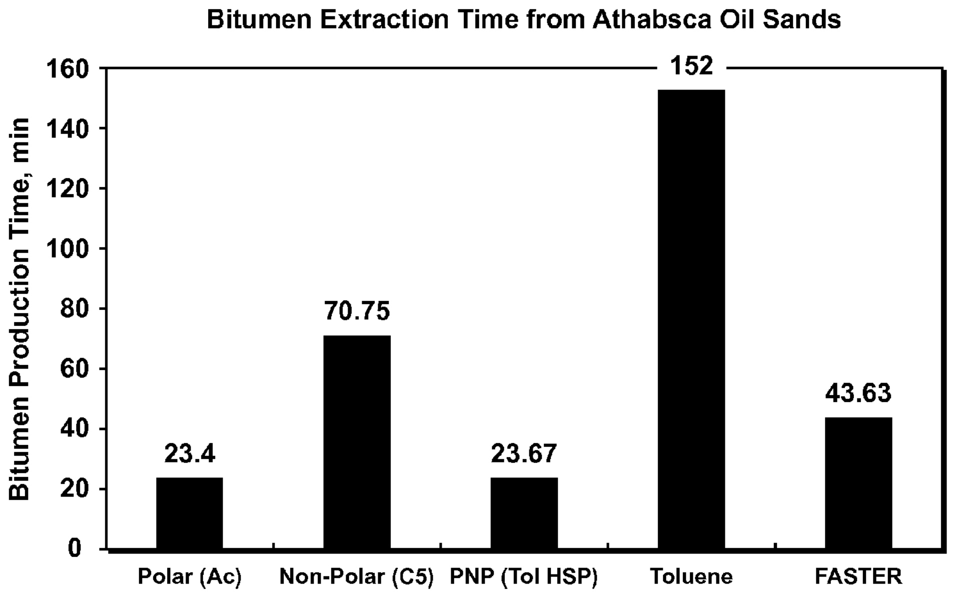
FIG. 2 is a graph comparing bitumen extraction times from an oil sands pack by different solvents.
Figure 3:
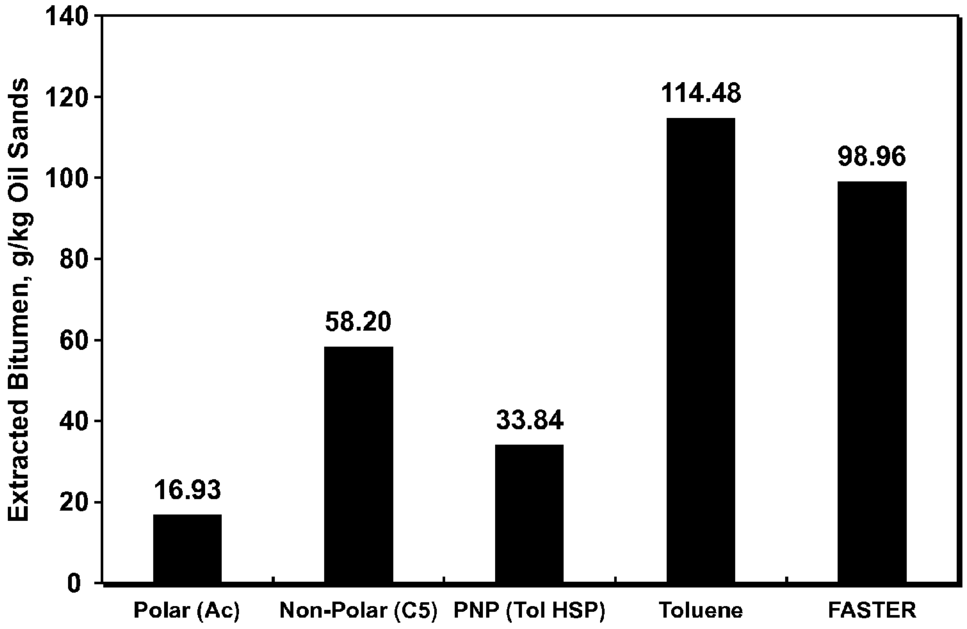
FIG. 3 is a graph comparing the quantity of bitumen extracted from oil sands by different solvents.

Since oil recovery economics is dependent on both the amount of total oil recovered and the total time of production, the oil production per unit kg oil sands were divided by the total time of production (different for each solvent as shown in FIG. 2) to obtain the average oil rate, expressed as g oil/kg oil sands per min.

Figure 4:
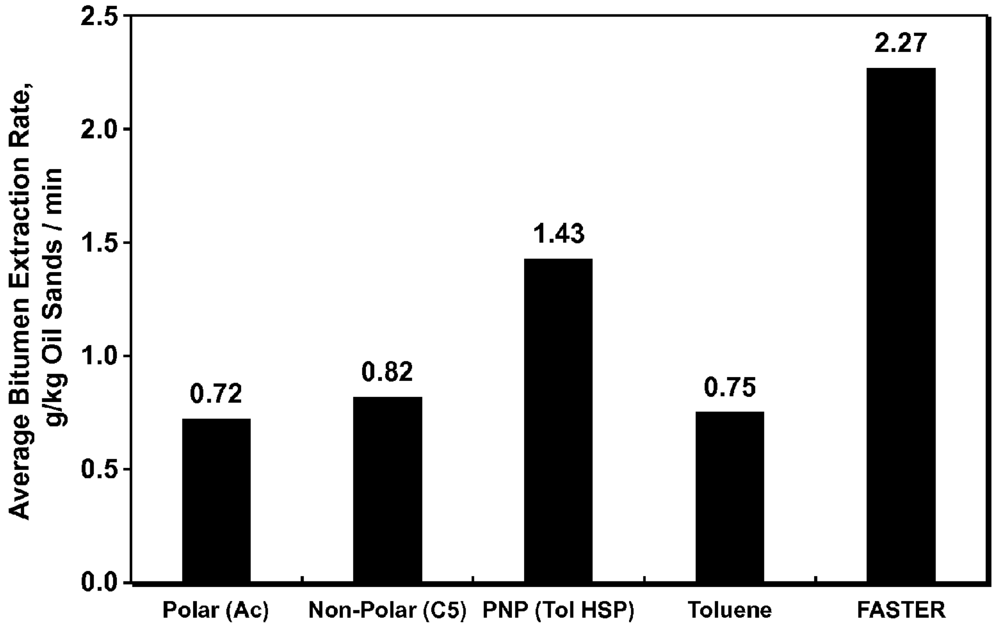
FIG. 4 is a graph comparing bitumen extraction rates by different solvents.

After normalizing by the production times, the average oil recovered per unit weight of oil sands per unit time is the highest for PNP of this invention at 2.27 and 0.82 for pentane and 0.75 for toluene (FIG. 4). Thus, the present solvent, on the average, produces 2.8 times more oil per unit time and per unit weight of oil sands than the non-polar solvent, n-pentane. The solvent blend matching the HSP of toluene recovers 1.43 g/kg oil sands/min, which is 37% lower than the 30:70 solvent.

The above examples clearly confirm the efficacy of the present solvent in penetrating the oil sands matrix faster and in recovering more oil in less time than the non-polar alkane solvent.

Although illustrated by a PNP mixture of n-pentane and acetone for ease of conducting the experiments at ambient conditions, other PNP combination can be equally effective to produce more oil faster than the alkane solvent alone. These combinations include, but are not limited to, ethane-acetone, butane-acetone or other polar-nonpolar combinations. The combinations may also include other ketones. Going to a lighter alkane has its benefits as it increases the solvent recovery potential from the reservoir and reduces the cost of separation on the surface.

Example 3

Present Solvent Crosses Water Layer to Penetrate Oil Sands Matrix

In this example, the ability of the present solvent to go through a water layer separating the solvent and oil sands matrix is demonstrated through a simple experiment.

For this demonstration, an Athabasca oil sands pack was prepared according to Example 1.

Over this sand pack was poured in 22 mL of n-pentane (HPLC grade from Fisher Scientific (Ottawa, Canada)) and the pack was shaken intermittently by hand after 16.75 minutes of no shaking The first drop of oil appeared after 34 minutes and the diluted bitumen was allowed to drain by gravity unattended. The drainage was complete in less than 57 minutes (exact time not recorded). The oil recovered from the n-C5 displacement was 62.43 g/kg oil sands, which is very close to the 58.20 g/kg oil sands recovered in Example 2 (FIG. 3).

To demonstrate the ability of the solvent to reach the oil sands matrix through a water layer, first 21 mL of Calgary tap water was poured on top of the oil sands four days after the extraction with n-C5. This water did not penetrate the oil sands matrix at all although being heavier than n-C5, presumably due to the sands pack becoming oil-wet after n-C5 extraction. After 16.5 minutes and still seeing no sign of water penetration, the water was poured out from the cylinder leaving only 2 mL above the oil sands pack. Then 21 mL of the present solvent was poured onto the top of the oil sands separated by the water layer.

Within 2 minutes of the new present solvent addition, fluid breakthrough at the bottom of the pack was noticed. The diluted bitumen draining out was collected for another 19 minutes. After evaporating the solvent from the produced diluted bitumen to a constant weight, it was determined that the present solvent injection recovered an additional 49.55 g of solvent-free bitumen per kg of oil sands.

This example shows that the present solvent can penetrate a water layer that separates the solvent from the oil sands matrix. It also shows that not only does it penetrate into the oil sands matrix, it also recovers additional oil from the pack previously extracted with n-C5.

Example 4

Comparison of Penetration and Production Rates of the Present Solvent and Gas Plant Condensates In two separate experiments with two sand packs prepared according to Example 1, the penetration rates of (a) Cold Lake Leming plant condensates alone and (b) a solvent mixture prepared by blending the condensates with acetone in a 70:30 condensate to acetone ratio (v/v), were measured. Both experiments were conducted at 24° C. and at atmospheric pressure.

The average penetration rate for the gas plant condensates alone was 0.42 m/D, while that for the condensates mixed with acetone was higher by a factor of 4.8 at 2.02 m/D.

The average oil rate by the gas plant condensates mixed with the polar solvent was also higher at 1.72 g per kg oil sands per min. than the 0.7 g per kg oil sands per min. for the condensates alone.

Example 5

Cleaning of Bitumen-Coated Vessels and Equipment

To demonstrate the cleaning power of the present solvent, the bottom 2 cm of four stainless steel blades were coated with Cold Lake bitumen. The blades for the present solvent and toluene demonstrations were each 22 mm wide, while the blade for the acetone test was 17 mm wide and that for the heptane was 20 mm wide.

The bitumen-coated blades were immersed in 100 mL of the solvents taken in a 120 mL bottle at room temperature (~22° C.) and the cleaning of the blades by dissolution of bitumen was videotaped in the absence of any stirring.

A stream of diluted bitumen running from the bottom of the blade to the bottom of the bottle was formed within four seconds of immersion of the coated blade into the present solvent. A narrower stream was formed upon immersion of the blade into the toluene. Three thin streaks of diluted bitumen were noted in the blade immersed in C7. No stream was formed in the acetone solvent.

The blade immersed in the solvent of the present invention was cleaned in less than 7 minutes, while the blade in toluene was cleaned in 11 minutes, showing that the present solvent dissolves bitumen faster than toluene.

The state of cleaning of the bitumen-coated blades recorded at 7 minutes shows that the blade in the present solvent is essentially free of bitumen (except for some brown spots) while the one in the toluene has still some bitumen. The blade in heptane is still coated with a significant amount of bitumen. The acetone did not show any appreciable dissolution of bitumen.

This example shows that present solvent can be a substitute for aromatic solvents for cleaning bitumen-coated vessels and equipment used in extraction of bitumen from oil sands.

Example 6

Simulation of Extraction of Bitumen from Oil Sands in Perforated Buckets

Quartz sands were first washed with water and then mixed with Cold Lake bitumen to prepare water-wet oil sands similar to those found in mined oil sands. About 9 g of these oil sands were taken in each of two spherical stainless steel mesh tea bags.

Each tea bag was then lowered into heptane (conventional solvent) or a PNP blend (the 30 acetone:70 n-heptane solvent), to compare the solvent extraction efficacy of these two solvents. The solvent volume in each case was 110 mL.

Within two seconds of lowering the tea balls into the solvent, the PNP started extracting the bitumen, creating a brown plume of diluted bitumen that settled to the bottom because of its higher gravity than the surrounding solvent. After hitting the bottom of the bottle, the plume then traveled upwards toward the top. By comparison, the heptane plume was formed after 20 seconds of contact and it was very light coloured and thinner than PNP plume.

The 30:70 PNP solvent-created plume took about 41 seconds to reach the half-way mark through the solvent, while the heptane plume took about 108 seconds to reach the same mark.

The difference in bitumen concentration in the two solutions after 527 seconds of contacting with each solvent was qualitatively determined. Against backlighting, the heptane-extracted bitumen allowed light to pass, while the PNP-extracted solution was opaque, indicating much higher bitumen concentration in the latter.

The superior extraction efficiency of the 30:70 solvent was evident in the solvent-extracted sands, which were significantly cleaner than the heptane (C7)-extracted sands.

This example shows the higher speed and the overall higher bitumen extraction efficiency of the solvent by the 30:70 PNP solvent compared to a conventional solvent in experiments simulating surface extraction of bitumen.

In the preceding description, for purposes of explanation, numerous details are set forth in order to provide a thorough understanding of the embodiments of the invention. However, it will be apparent to one skilled in the art that these specific details are not required in order to practice the invention.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A solvent for extracting bitumen, the solvent comprising:

(a) a polar component, the polar component being a compound comprising a non-terminal carbonyl group; and (b) a non-polar component, the non-polar component being a substantially aliphatic substantially non-halogenated alkane;

wherein the solvent has a Hansen hydrogen bonding parameter of 0.3 to 1.7 and wherein the solvent has a volume ratio (a):(b) of 20:80 to 40:60.

2. The solvent according to claim 1, wherein the Hansen hydrogen bonding parameter is 0.7 to 1.4.

3. The solvent according to claim 1, wherein the volume ratio is 25:75 to 35:65.

4. The solvent according to claim 1, wherein the volume ratio is 29:71 to 31:69.

5. The solvent according to claim 1, wherein the polar component (a) is a ketone.

6. The solvent according to claim 1, wherein the polar component (a) is acetone.

7. The solvent according to claim 1, wherein the non-polar component (b) is a C2-C7 alkane.

8. The solvent according to claim 1, wherein the non-polar component (b) is a C2-C7 n-alkane.

9. The solvent according to claim 1, wherein the non-polar component (b) is a gas plant condensate comprising alkanes, naphthenes, and aromatics.

10. The solvent according to claim 1, wherein the bitumen extraction is in situ bitumen extraction.

11. The solvent according to claim 10, wherein the use is for injecting the solvent into an injection well to reduce the viscosity of in situ bitumen.

12. The solvent according to claim 11, wherein the use is for in situ bitumen extraction by solvent-assisted steam-assisted gravity drainage, a cyclic solvent process, a liquid addition to steam for enhanced recovery process, a vapour extraction process, or a heated solvent process.

13. A solvent for cleaning a bitumen-coated surface, the solvent comprising:

(a) a polar component, the polar component being a compound comprising a non-terminal carbonyl group; and (b) a non-polar component, the non-polar component being a substantially aliphatic substantially non-halogenated alkane;

wherein the solvent has a Hansen hydrogen bonding parameter of 0.3 to 1.7 and wherein the solvent has a volume ratio (a):(b) of 20:80 to 40:60.

14. The solvent according to claim 13, wherein the Hansen hydrogen bonding parameter is 0.7 to 1.4.

15. The solvent according to claim 13, wherein the non-polar component (b) is a C2-C7 alkane.

16. The solvent according to claim 13, wherein the non-polar component (b) is a C2-C7 n-alkane.

17. The solvent according to claim 13, wherein the non-polar component (b) is an n-pentane.

18. The solvent according to claim 13, wherein the non-polar component (b) is an n-heptane.

19. The solvent according to claim 13, wherein the non-polar component (b) is a gas plant condensate comprising alkanes, naphthenes, and aromatics.

20. A solvent for extracting bitumen, the solvent comprising:

(a) a polar component, the polar component being a compound comprising a non-terminal carbonyl group; and (b) a non-polar component, the non-polar component being a substantially aliphatic substantially non-halogenated alkane;

wherein the solvent has a Hansen hydrogen bonding parameter of 0.3 to 1.7 and wherein the solvent has a volume ratio (a):(b) of 10:90 to 24:76.

* * * * *